United States Patent
Haas

(10) Patent No.: US 6,439,087 B1
(45) Date of Patent: Aug. 27, 2002

(54) MECHANISM FOR GRIPPING AND ROTATING PIPE, INCLUDING PLASTIC COVERED PIPE

(75) Inventor: John L. Haas, Northridge, CA (US)

(73) Assignee: Rothenberger USA, Inc., Monterey Park, CA (US)

( * ) Notice: Subject to any disclaimer, the term of this patent is extended or adjusted under 35 U.S.C. 154(b) by 0 days.

(21) Appl. No.: 09/580,124

(22) Filed: May 30, 2000

(51) Int. Cl.[7] .......................... B23B 25/00; B23B 13/02
(52) U.S. Cl. .............................. 82/163; 82/164; 82/170
(58) Field of Search .......................... 82/113, 162, 163, 82/164, 170

(56) References Cited

U.S. PATENT DOCUMENTS

| | | | |
|---|---|---|---|
| 2,612,809 A | * 10/1952 | Shager | .................. 82/164 |
| 3,270,592 A | 9/1966 | Behnke | |
| 3,851,549 A | * 12/1974 | Schlitt et al. | ................ 81/53 A |
| 4,611,823 A | 9/1986 | Haas | |
| 4,634,323 A | * 1/1987 | Wagner et al. | ............... 409/167 |
| 4,638,655 A | * 1/1987 | Sebastian et al. | .............. 72/208 |
| 5,282,403 A | * 2/1994 | Rouleau | ....................... 82/164 |
| 6,131,491 A | * 10/2000 | Hirse | ............................. 81/99 |

* cited by examiner

Primary Examiner—Henry Tsai
(74) Attorney, Agent, or Firm—William W. Haefliger

(57) ABSTRACT

Plastic surface pipe rotary drive apparatus, comprising in combination a drive rotor rotatable about a central axis; a set of jaws spaced about a central axis, and operatively connected to a rotor to rotate about parallel jaw axes in response to rotation of the drive rotor, the jaws having work engaging surfaces extending eccentrically relative to their respective jaw axes; and each of the surfaces extending generally circularly about a locus offset from a jaw axis associated with the surfaces.

4 Claims, 5 Drawing Sheets

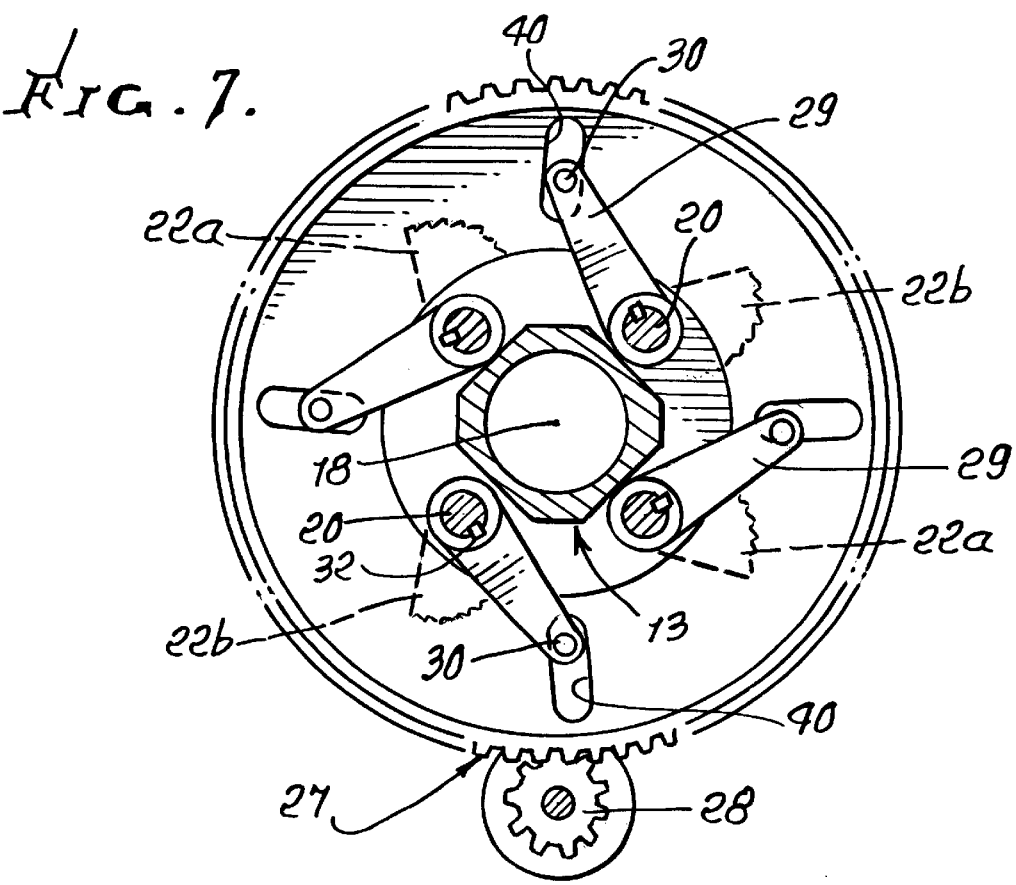
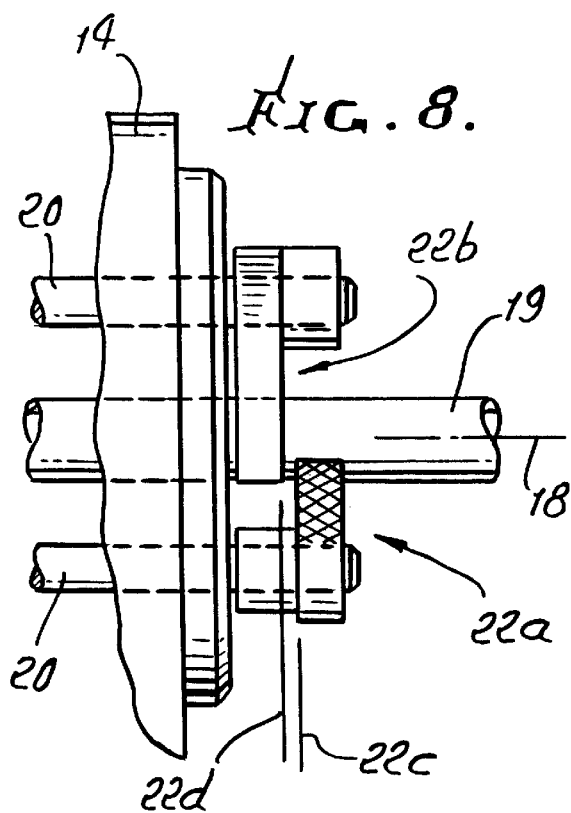
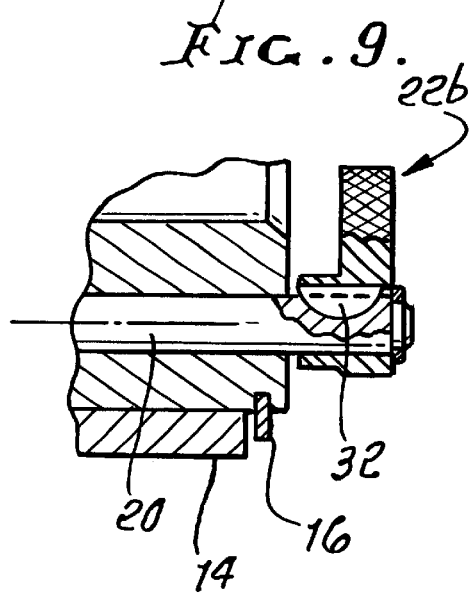

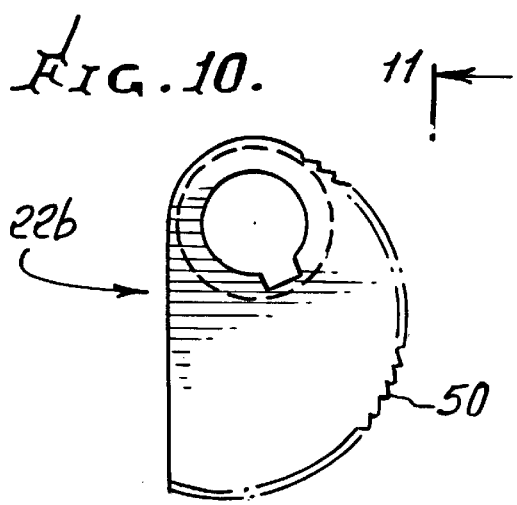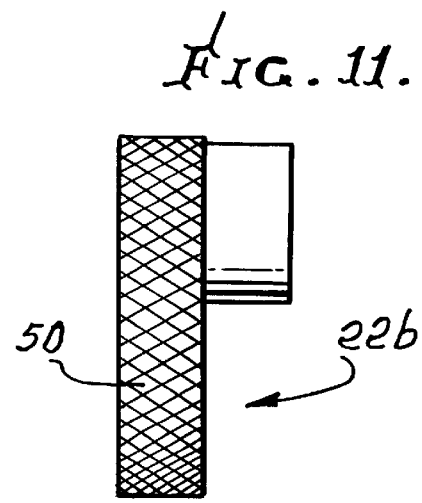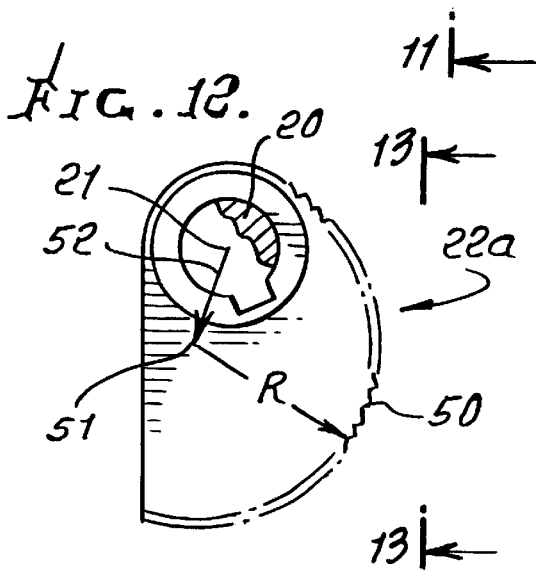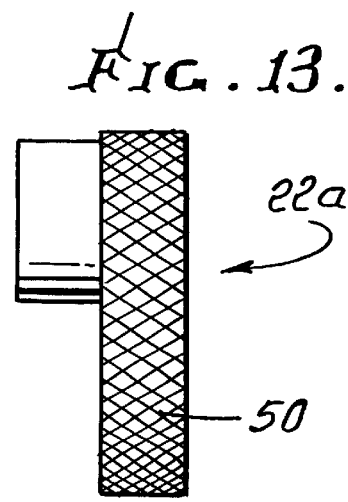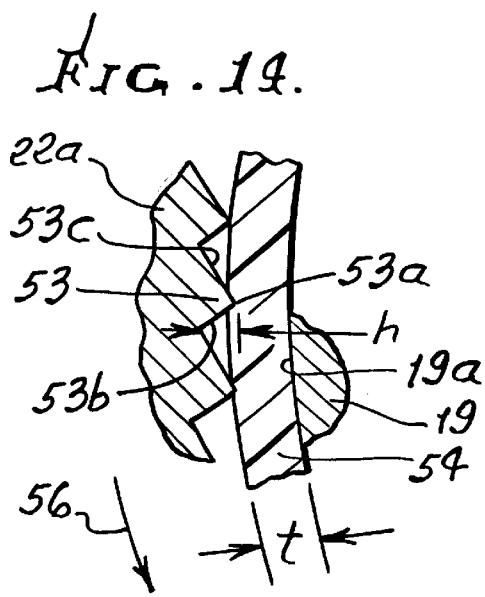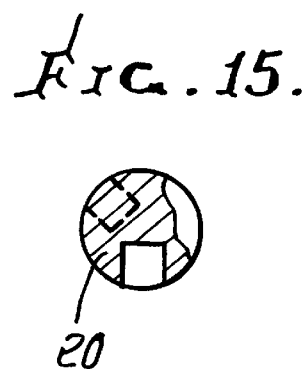

US 6,439,087 B1

MECHANISM FOR GRIPPING AND ROTATING PIPE, INCLUDING PLASTIC COVERED PIPE

BACKGROUND OF THE INVENTION

This invention relates generally to machines for centering and rotating workpieces such as pipe to be threaded, cut or otherwise subjected to a forming on e particularly the invention concerns improvements having to do with gripping, centering, and rotating of plastic sheath covered pipe.

It is a major object of the invention to overcome certain disadvantages associated with the operation and performance of prior machines for rotating workpieces, such as pipe, upon which threads are to be formed. If the pipe to be rotated is covered by a synthetic plastic layer, such as a plastic sheath, gripping problems arise. These involve possible damage to the plastic sheath, as during gripping and rotating. There is need for improvements in pipe gripping and rotating apparatus, which will overcome such problems and difficulties.

SUMMARY OF THE INVENTION

It is a major object of the invention to provide improved apparatus for gripping and rotating pipe, especially plastic covered pipe, as referred to, to avoid damage to the plastic material. Basically, apparatus incorporating the invention includes:

a) a drive rotor rotatable about a central axis,
b) a set of jaws spaced about the central axis, and operatively connected to the rotor to rotate about parallel jaw axes in response to rotation of the drive rotor,
c) the jaws having work engaging surfaces extending eccentrically relative to their respective jaw axes,
d) each of such surfaces extending generally circularly about a locus offset from a jaw axis associated with the surfaces.

For best results, the described offset is less than the radius of a circle defined by the work engaging surface.

Another object of the invention includes provision of a series of work engaging projections at the work engaging surface, the projections staggered in widthwise and lengthwise directions along said surface. The pipe plastic surface becomes compressed by the projections which indent the plastic material, the projections having heights less than the thickness of the plastic layer defining said surface. Further, the projections are preferably tilted relative to radii extending to said projections from the jaw axes.

Yet another object is the provision of links interconnecting the drive rotor with the jaws. As will be seen, only a single link is needed to connect the drive rotor with each jaw, as referred to.

These and other objects and advantages of the invention, as well as the details of an illustrative embodiment, will be more fully understood from the following specification and drawings, in which:

DRAWING DESCRIPTION

FIG. 7 is a view like FIG. 5, but showing jaws in outwardly rotated positions;

FIG. 8 is a fragmentary section taken on lines 8—8 of FIG. 4;

FIG. 9 is a fragmentary section taken on lines 9—9 of FIG. 4;

FIG. 10 is a side elevation showing one jaw configuration;

FIG. 11 is a view taken on lines 11—11 of FIG. 10;

FIG. 12 is a side elevation showing another jaw configuration;

FIG. 13 is a view taken on lines 13—13 of FIG. 12;

FIG. 14 is an enlarged fragmentary view showing jaw teeth engagement with a non-metallic pipe surface; and FIG. 15 is a section taken through a jaw sleeve.

DETAILED DESCRIPTION

Figure 1:
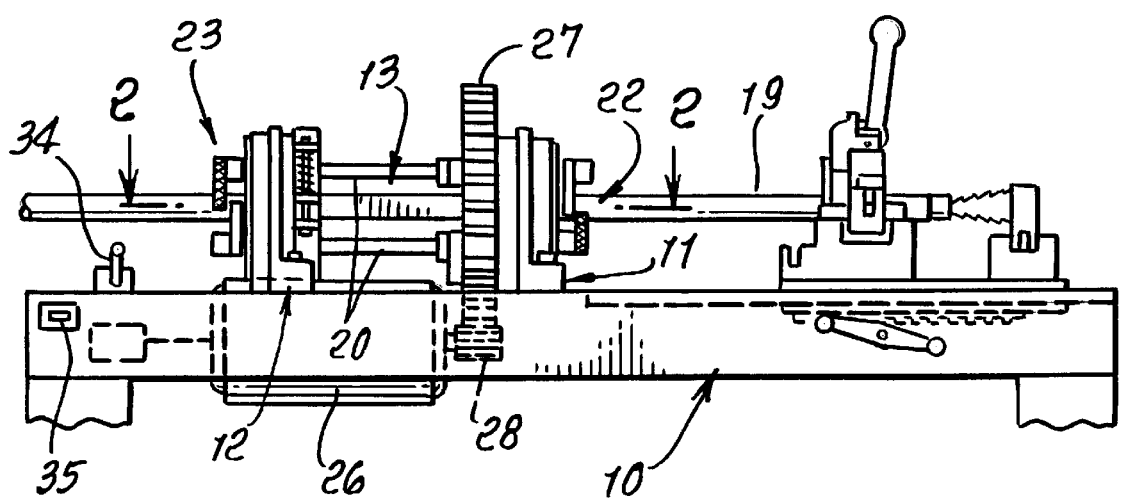
FIG. 1 is a front elevation of the overall apparatus.
Figure 2:
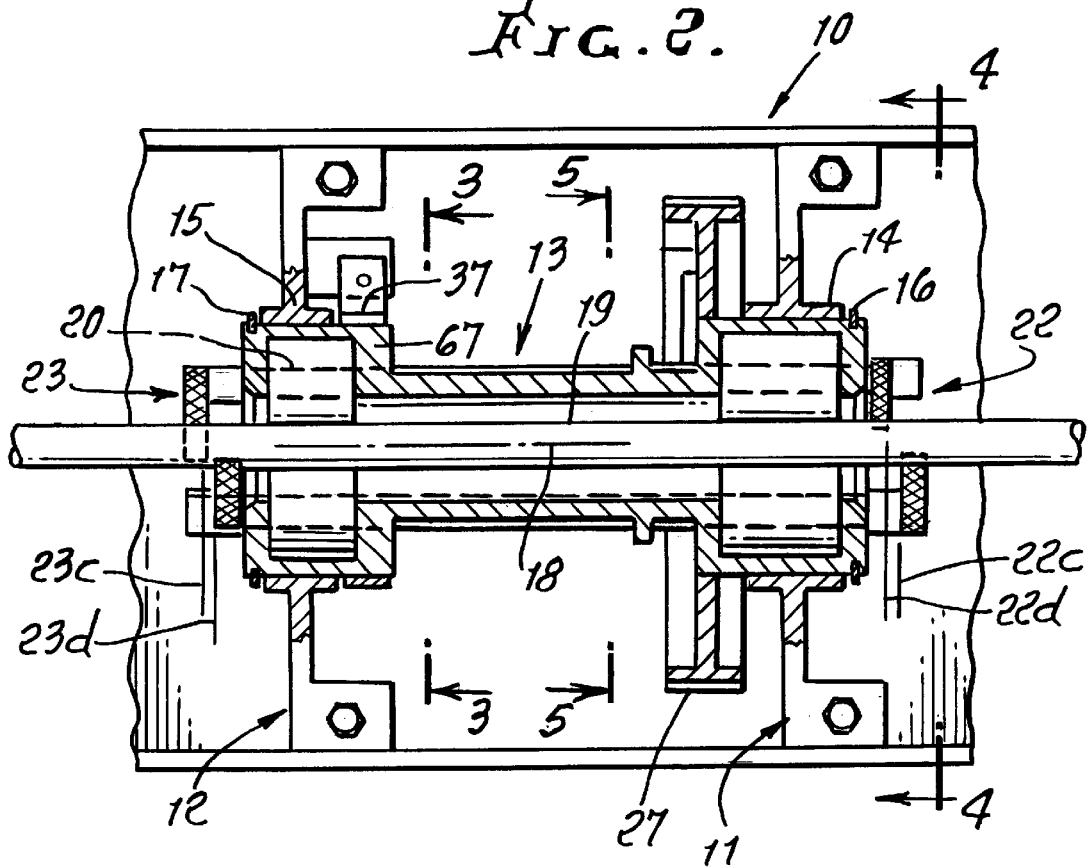
FIG. 2 is an enlarged horizontal section taken on line 2—2 of FIG. 1.
Figure 3:
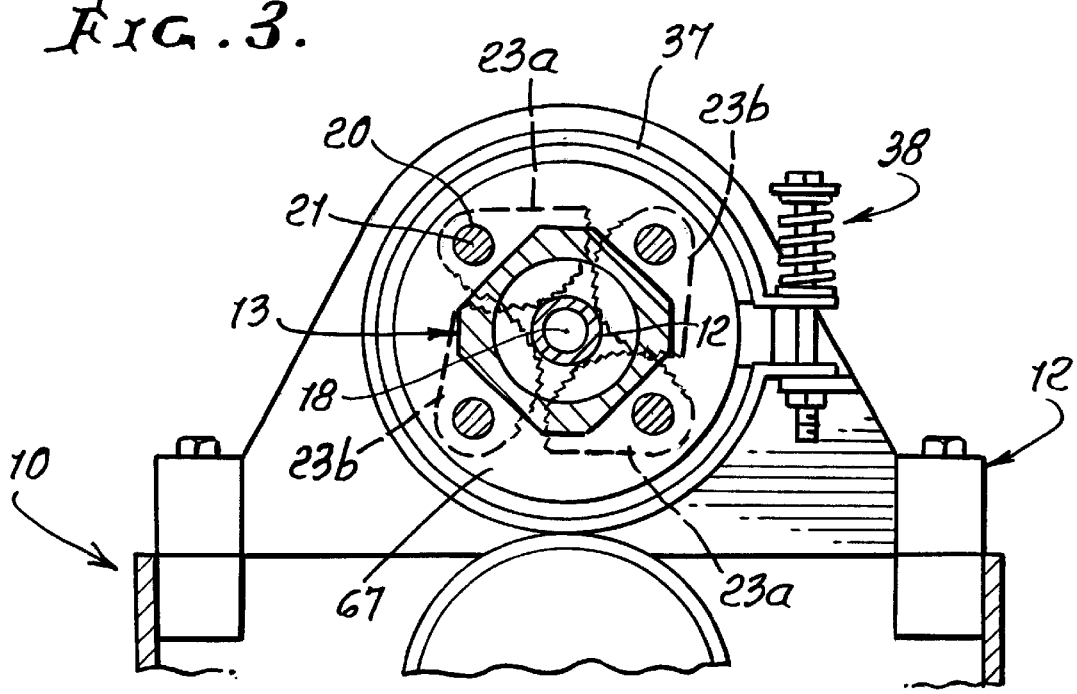
FIG. 3 is a fragmentary sectional elevation taken on line 3—3 of FIG. 2.

Referring first to FIGS. 1–3, the overall apparatus includes; leg supported base 10 mounting spaced pillow blocks 11 and 12. The latter carry hubs which in turn journal a hollow spindle assembly or carrier 13 at spindle flanges 14 and 15. Retainers 16 and 17 on the hubs act to retain the spindle assembly against axial dislodgement relative to the pillow blocks. Accordingly, the spindle is rotatable about a longitudinal and central axis of rotation indicated at 18, which coincides with and may be considered as defined by the axis of a workpiece such as pipe 19 extending within the spindle interior.

The carrier or spindle 13 supports parallel pivots such as rods 20 seen in FIG. 3 as having pivot axes 21 equally spaced at 90 degree intervals about the central axis 18. The jaws are attached to the extreme forward and rearward ends of the pivots, as indicated in FIG. 2 by forward and rearward jaw sets 22 and 23. There are four jaws 22a and 22b in set 22, two like jaws 22a diametrically opposed and extending in a first plane 22c, and two like jaws 22b diametrically opposed and extending in a second plane 22d. Planes 22c and 22d are axially offset, whereby the jaws 22a and 22b engage the work surface at axially spaced locations, for stability. Likewise, there are four jaws 23a and 23b in set 23, two like jaws 23a diametrically opposed and extending in a first plane 23c, and two like jaws 23b diametrically opposed and extending in a second plane 23d. Planes 23c and 23d are axially offset, whereby the jaws 23a and 23b engage the work surface at axially spaced locations, for stability. Corresponding planes 22c and 22d are seen in FIG. 8. As will be seen, the jaws may pivot inwardly toward the work such as pipe 19 in forward and reverse pivoting directions, the forward and inward direction indicated by the arrow 24 in FIG. 4. Likewise, the reverse and inward direction is shown by the arrow 25 in FIG. 6. Pivot rods 20 are suitably journaled for pivoting by the spindle hubs 14 and 15. The rods are simultaneously rotated to rotate the jaws simultaneously inwardly, or outwardly, relative to axis 18.

The pivots 20 are actuated to pivot about axes 21 by a reversible drive, typically including a reversible motor 26 carried by the base 10, a ring gear 27 driven by the motor pinion 28, and links 29 having lost motion pivot connections at 30 to the gear 27, and key connections at 32 to the rods 20. As seen in FIG. 2, the ring gear is suitably journaled for rotation relative to the spindle flange 14. FIG. 1 shows a switch lever 34 in the "OFF" position and movable to the right or left for selective forward or reverse actuation of the driver motor. A manual speed control for the motor may also be provided as is indicated at 35.

Figure 5:
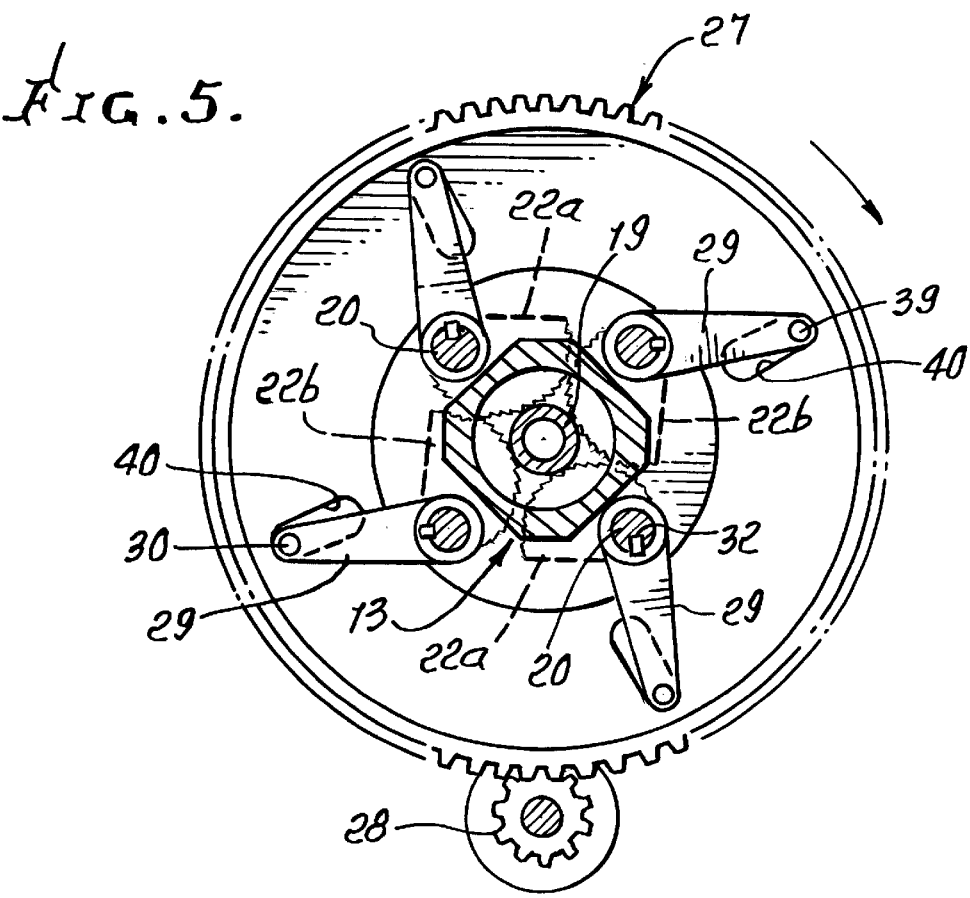
FIG. 5 is a sectional elevation taken on line 5—5 of FIG. 2.

Turning now to FIG. 5, the jaws 22a and 22b of the forward set 22 are illustrated as having been driven in what may be considered as a first mode characterized by inwardly forward pivoting into gripping and centering engagement with the workpiece or pipe 19. Such pivoting is effected in response to counter-clockwise rotation of the gear wheel 27, with the pivot carrying spindle assembly 13 frictionally held against rotation about the central axis 18. In this regard, FIGS. 1–3 illustrate friction band segments 37 held clamped against hub 67 of carrier 13 to resist spindle rotation, a clamp and tension spring assembly 38 being provided for this purpose. Jaws 23a and 23b of the second set are likewise actuated.

Figure 4:
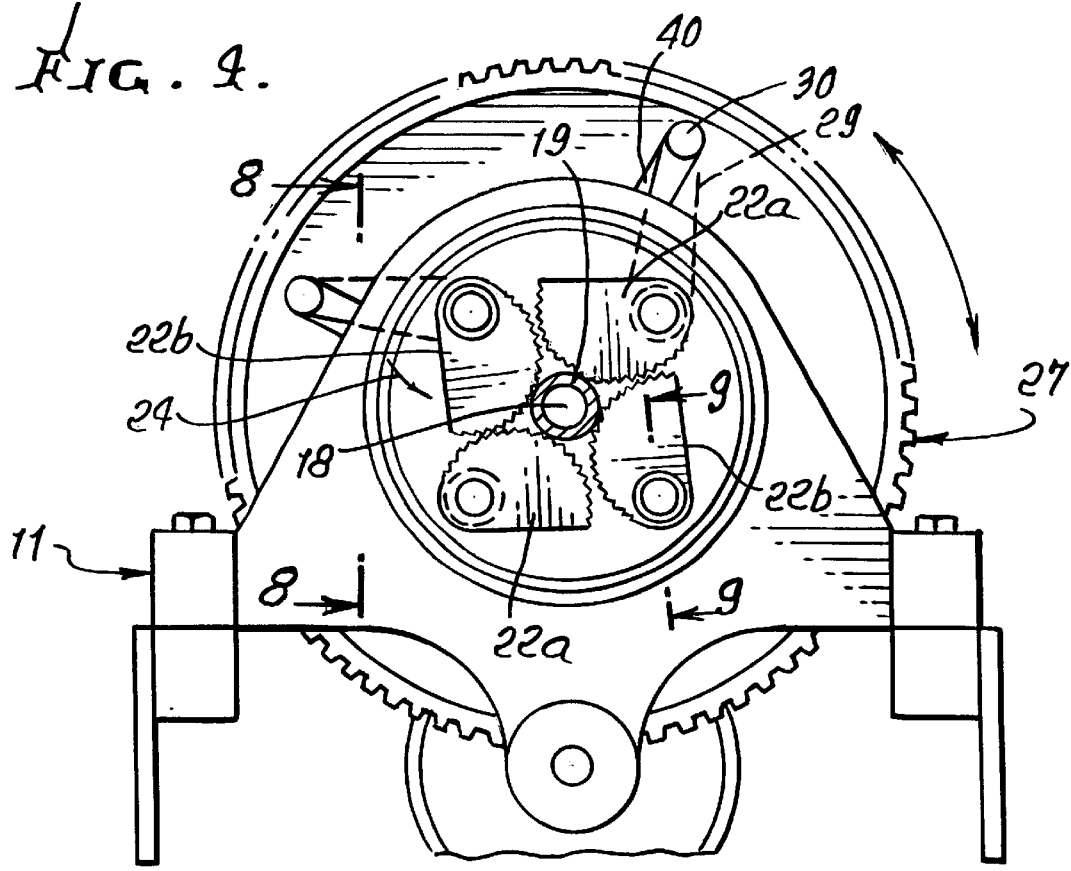
FIG. 4 is a sectional elevation taken on line 4—4 of FIG. 2, showing the jaws engaging pipe for a right hand threading operation.

After the jaws of the sets 22 and 23 grip and center the workpiece, they are blocked by the work against further inward pivoting, whereby the drive then rotates the spindle 13, jaws and work about the central axis 18 as seen in FIG. 4. The work may then be typically subjected to a right hand threading operation as will be described. At this time the hub 67 rotates in sliding frictional engagement with the friction band segments 37, and one advantageous result of the jaw configuration in the assembly consists in the lessening of needed friction imposed by the band segments, with consequent lessening of wear and heat generation during rotary driving of the work.

Figure 6:
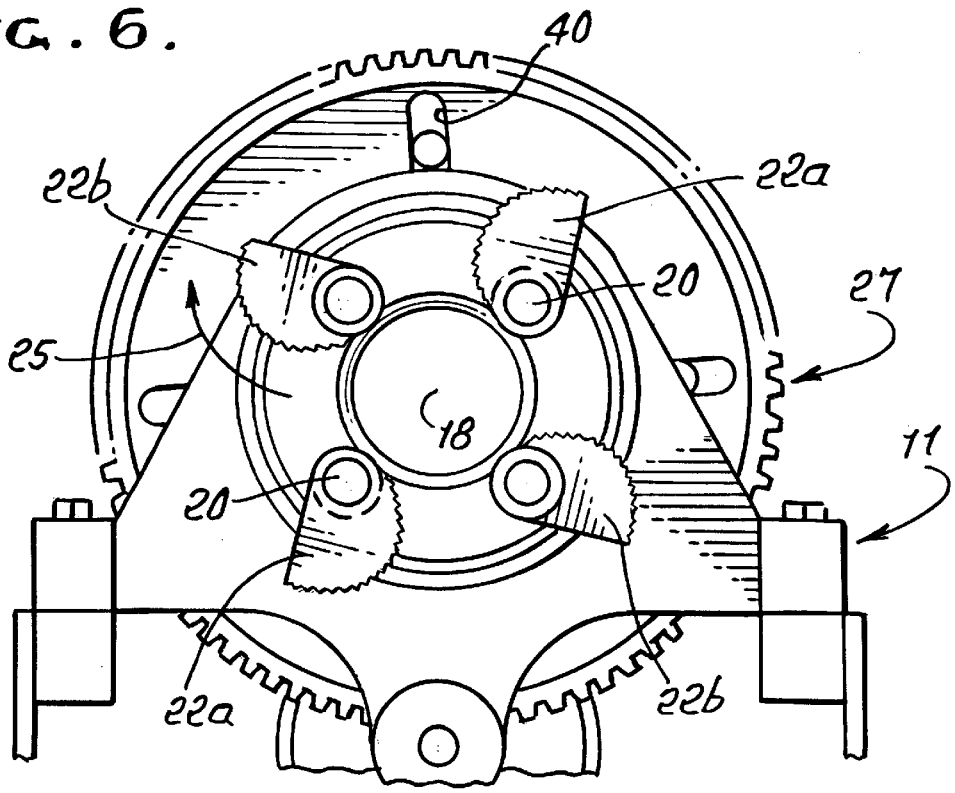
FIG. 6 is a view like FIG. 4, but showing jaws in outwardly rotated position.

FIGS. 6 and 7 show the jaws completely released from the work and pivoted to near extreme outward positions, for subsequent inward and forward pivoting to the condition seen in FIG. 4. Such outward pivoting is limited by the configurations of slots 40 which extend generally radially in the gear wheel. Pins or studs 30 integral with the links 29 project and slide in those slots, to be guided therein as the gear wheel turns, and to provide pivotal connection between the links and gear wheel.

Recognizing that FIG. 4 shows the same jaw condition as seen in FIG. 5, reference will now be made to FIG. 6 which is like FIG. 4 but also illustrates the reversely pivoted conditions of the jaws. In that view the forward set 22 of jaws is seen as having been driven in what may be considered as a second mode characterized by outwardly reverse pivoting of the jaws. Such pivoting is effected in response to counterclockwise pivoting of the gear wheel 27 with the spindle assembly initially held frictionally against rotation about the central axis 18.

Referring now to the specific construction and arrangement of the jaws in a preferred embodiment, they are seen in FIGS. 10 and 12 as having work engaging surfaces 50 extending eccentrically relative to their respective jaw pivot axes 21. Each work engaging surface 50 is located on one side of the jaw, and extends generally circularly about a locus, as at 51, which is offset from the jaw and rod axis 21 of pivoting. That offset, indicated at 52 is less than the radius R of the circle defined by surface 50. A series of work engaging projections 53 is formed on surface 50, those projections staggered in widthwise and lengthwise directions along surface 50. Also, the projections are tilted relative to radii R, that extend to the projections from the jaw axes. The projections have heights "h" less than the thickness "t" of a plastic layer 54 on the metallic pipe, whereby the jaw projections do not penetrate to the pipe metal surface 19a, during jaw engagement with the pipe. Such penetration to the pipe metal surface could otherwise produce water access holidays, resulting in corrosion. Note also that each projection tapers toward an apex 53a, and has opposite sides 53b and 53c. Side 53b is shorter and more sharply angled than side 53c to enhance the grip to the plastic material, in the direction 56 of jaw rotation. See FIG. 14. During each rotation, as during threading, the pipe plastic surface is compressed by the projections, which indent the plastic material, as shown in FIG. 14.

Since jaw deflection under load is symmetrical, there is no differential tendency of the jaws to slip relative to the work due to different stress and strain relationships imposed on the jaws. Consequently, the system is balanced and at the same time work of very small diameter may be gripped and rotated. A combination of desirable features is provided overcoming the problem of gripping and rotating pipe coated with a thin plastic coating, as during pipe threading, when considerable grip-torque must be effectively transmitted to the pipe, through the thin plastic coating.

I claim:

1. Plastic surface pipe rotary drive apparatus, comprising in combination a) a drive rotor rotatable about a central axis, b) a set of jaws spaced about said central axis, and operatively connected to said rotor to rotate about parallel jaw axes in response to rotation of the drive rotor, c) said jaws having work engaging surfaces extending eccentrically relative to their respective jaw axes, d) each of said surfaces extending circularly about a single locus offset from a jaw axis associated with said surface, there being one and only one said locus for each jaw, e) there being only a single link operatively connecting the drive rotor with each jaw, f) there being a stud on each said single link, and there being a slot in the drive rotor slidably receiving that stud for pivotally coupling each jaw to the drive rotor, g) there being a series of work engaging projections at said work engaging surfaces, said projections staggered in widthwise and lengthwise directions along said surface, said projections being tilted relative to radii extending to said projections from the jaw axes, h) there being four jaws in said set, first and second of said jaws diametrically opposed relative to said axis, in a first plane, and third and fourth of said jaws diametrically opposed relative to said axis, in a second plane, said planes axially spaced apart, i) and including a pipe plastic surface engaged by said jaw surfaces, j) said pipe plastic surface compressed by said projections which indent the pipe plastic surface, the projections having heights less than the thickness of a plastic layer defining said surface.

2. The combination of claim 1 wherein said offset is less than the radius of a circle defined by the work engaging surface.

3. The combination of claim 1 wherein said jaw surfaces face in one direction about the central axis.

4. The combination of claim 1 wherein each of said jaws has work engaging projections in two groups, the projections of one group angled relative to the projections of the other group.

\* \* \* \* \*